June 13, 1944.    G. E. OAKLEY ET AL    2,351,535
VARIABLE ANGLE DRIVE MECHANISM
Filed Jan. 19, 1943
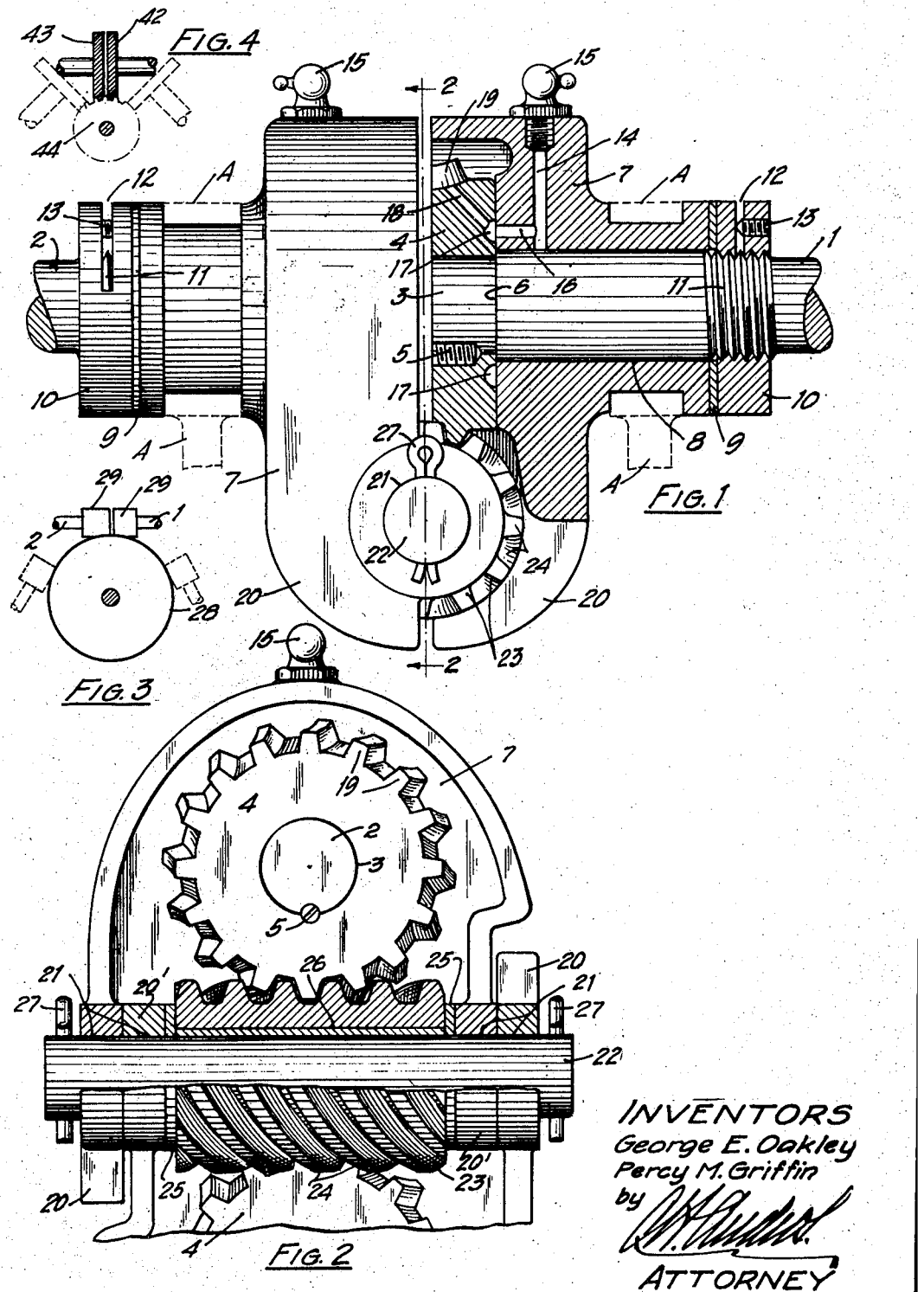
INVENTORS
George E. Oakley
Percy M. Griffin
by
ATTORNEY Patented June 13, 1944

2,351,535

UNITED STATES PATENT OFFICE 2,351,535

VARIABLE ANGLE DRIVE MECHANISM

George E. Oakley and Percy M. Griffin, Albany, N. Y., assignors to Consolidated Car-Heating Company, Inc., Albany, N. Y., a corporation of New York Application January 19, 1943, Serial No. 472,820

7 Claims. (Cl. 74—383)

Our invention relates to driving mechanisms and particularly to a device for connecting two angularly disposed shafts together. The angle between the shafts may be any angle between 0° and 180°, and the angle may be varied throughout this range while the shafts are rotating. In other words, the device will function with the shafts at any angle between a straight line drive, in which the driving and driven shaft may be either parallel or coaxial, and a "back drive" in which the driven shaft runs from the connecting means backwardly alongside and parallel to the driving shaft.

The principal object of our invention therefore is to provide an angle drive mechanism for operatively connecting together two shafts which may be disposed to each other at any angle between 0° and 180°. Another object is to provide such a device through which a constant torque will be transmitted irrespective of the angle between the two shafts. Another object is to provide such a device in which the friction losses are very low and substantially constant irrespective of the angle between the shafts. A still further object is to provide such a device comprising two identical, interchangeable half portions, whereby the fabrication of the device is simplified and its cost minimized.

We accomplish these and other objects, which will be apparent as the description proceeds, by utilizing three gear elements, one on the driving shaft, one on the driven shaft, and an idler between the two first mentioned elements about the axis of which each of the other elements is separately revolvable, and which serves to transmit motion from the driving element to the driven element.

Our invention includes the novel elements and the combinations and arrangements thereof described below and illustrated in the accompanying drawing, in which—

Fig. 1 is an elevation view, partially in section, of our device in its preferred form;

Fig. 2 is a section of Fig. 1 in the plane 2—2 with certain parts broken away, and with a fragmentary showing of the other half of the device revolved 180° about the axis of the idler gear element from the position shown in Fig. 1;

Fig. 3 is a small scale fragmentary schematic elevation view of a modified gearing arrangement; and Fig. 4 is a small scale fragmentary schematic elevation view of a further modification.

Referring to the drawing, although either shaft may drive, 1 will be considered the drive shaft and 2 the driven shaft. Since both halves of the device are identical and either shaft may be the drive shaft it seems necessary to describe in detail only one of these halves. The shaft 1, for example, at its inner end has a reduced portion 3 on which the gear element 4 is keyed, as shown at 5, and which provides a shoulder 6 against which the gear element 4 is seated. Each half casing 7 is provided with a bore 8 adapted to receive the associated shaft. A thrust washer 9 surrounds the shaft and abuts the end of the half casing and is adjustably secured in place to maintain a close running fit between the gear element 5 and the casing, by means of the threaded collar 10 which cooperates with a threaded portion 11 of shaft 1. The collar 10 is split, as shown at 12, and is fractionally secured in adjusted position on the threaded portion of the shaft by means of the set screw 13. Each half casing is provided with a bore 14 through which lubricant may be forced from the fitting 15 to lubricate the shaft bearing in the casing. The casing is also provided with a cross bore 16 connecting with bore 14 and with the annular recess 17 in the gear element 5 so that the surface between the gear and the casing is lubricated. The gear element 5 is also provided with spaced passages 18 providing communication between the recess 17 and the spaces between the teeth 19.

Each half casing is provided at one side with a depending lug 20, and at the other side with a cylindrical lug 20' having aligned openings 21 therein adapted to receive the transverse shaft 22 on which the idler gear element 23 is mounted. In the preferred embodiment shown in Figs. 1 and 2, the element 23 is a worm, preferably an 8 thread worm, having a pitch approximately equal to its circumference so that the thread 24 thereon will be disposed at an angle of approximately 45° to a plane perpendicular to the worm axis. Such an angle is desirable because the worm functions both as a driven and a driving element. Thrust washers 25 are interposed between the ends of the worm and the adjacent depending lugs on the casing, and a bushing 26 is preferably interposed between the worm and the shaft 22. The shaft 22 is held in place by the cotter pins 27 at each end.

The worm meshes and cooperates with each of the gear elements 5 and each of these elements may be considered as such a half of a complete worm gear or wheel as would be formed by splitting or sawing the complete worm gear in a plane through the center thereof perpendicular to its axis.

From the foregoing it will be apparent that each half of the casing forms a bearing for one of the gear elements 5 and that these bearings are mounted so that they may revolve about the axis of the shaft 22 from the position shown in Fig. 1 to the position shown in Fig. 2, or through an angle of about 180°. Thus, the device may be used to connect two shafts which are angularly disposed to each other at any angle throughout the range, 0° to 180°.

When the driving and driven shafts are coaxial, or nearly coaxial, there is, of course, a tendency for the connecting device to rotate about the axis of the driven shaft instead of to transmit motion to the driven shaft. For the purpose of holding the device in fixed position, each half casing is held in a suitable bracket A, shown in fragmentary dotted outline in Fig. 1, and which may be bolted to the floor or wall or otherwise secured.

Instead of using a worm as an idler and a worm wheel on the end of each shaft it would be possible to utilize a worm wheel or gear 28 as an idler and a half worm 29 on the end of each shaft, as shown in Fig. 3; or spiral gears throughout, as shown in Fig. 4. In either case, the teeth on the cooperating gears extend spirally or helically around the gear cylinders and the gears may be designated generically as screws gears.

Fig. 4 shows a further modification in which spiral gear halves 42 and 43, with the teeth cut at an angle of 45°, are employed as the driving and driven gears, and a similar spiral gear 44 is employed as an idler.

The arrangement described makes it possible to construct both halves of any of these mechanisms exactly alike throughout, although each half of the casing is asymmetrical with respect to the axis of the shaft associated therewith. A constant torque is transmitted from one shaft to the other irrespective of the axial alignment of the shafts and the shafts always rotate in the same direction. Thus, a clockwise drive remains clockwise irrespective of the angular relationship of the shafts.

As distinguished from a universal joint in which friction increases rapidly as the angle between the shafts increases, in our device the friction is substantially constant and independent of the angular relationship of the shafts; and to reduce it to a minimum we prefer to form the idler of steel and the driving and driven gear elements of bronze.

While we have described our invention in its preferred embodiment, it is to be understood that the words which we have used are words of description rather than of limitation and that the changes within the purview of the appended claims may be made without departing from the true scope and spirit of our invention in its broader aspects.

What we claim is:

1. A variable angle drive mechanism comprising a worm, a bearing therefor, a driving gear in mesh with said worm, a bearing for said driving gear, a driven gear in mesh with said worm, a bearing for said driven gear, the axes of said driving and said driven gear being angularly disposed to the axis of said worm, and separate pivotal mountings for said gears having their axes coincident with the axis of said worm.

2. A variable angle drive mechanism comprising a worm element, a bearing therefor, a driving gear cooperating with said worm, a bearing for said driving gear, a driven gear cooperating with said worm, a bearing for said driven gear, and a pivotal mounting for said driving gear and its bearing having its axis coincident with the axis of said worm; whereby said driving gear and its bearing may be revolved about said worm from a position in which the driving and driven gear are substantially coaxial to a position in which the axes of said gears lie in spaced, substantially parallel relation, and both said driving and said driven gear rotate in the same direction.

3. A variable angle drive mechanism comprising a worm element, a bearing therefor, a driving gear cooperating with said worm, a bearing for said driving gear, a driven gear cooperating with said worm, a bearing for said driven gear, and a pivotal mounting for said driven gear and its bearing having its axis coincident with the axis of said worm; whereby said driven gear and its bearing may be revolved about said worm from a position in which the driving and driven gear are substantially coaxial to a position in which the axes of said gears lie in spaced, substantially parallel relation, and both said driving and said driven gear rotate in the same direction.

4. A variable angle drive mechanism comprising a worm gear, a bearing therefor, a driving worm cooperating with said gear, a second worm driven by said gear, and separate bearings for said worms pivotally mounted to revolve about the axis of said gear.

5. A variable angle drive mechanism comprising a casing formed in separate halves each half having a passage therethrough adapted to form a bearing for a shaft, means pivotally connecting said half casings together, an idler screw gear element in said casing and a bearing therefor having its axis coincident with the axis of said pivotal connecting means, separate shafts having their axes substantially coplanar extending through the passages in said half casings, and a screw gear element in each half casing on the shaft extending therethrough and in mesh with said idler gear element; whereby the angular relation of said shafts may be varied by effecting relative movement of said half casings about their pivotal connection.

6. A variable angle drive mechanism comprising an idler spiral gear element, a bearing therefor, a driving spiral gear element and a driven spiral gear element each in mesh with said idler and having their axes substantially coplanar and lying in a plane angularly disposed to the axis of said idler, a bearing for each of said driving and driven gear elements, and a separate pivotal mounting for each of said last mentioned bearings having its axis coincident with the axis of said idler; whereby said driving and said driven gears rotate in the same direction and either may be revolved about the axis of said idler with respect to the other.

7. A variable angle drive mechanism comprising an idler gear of the screw type, a bearing therefor, a driving gear of the screw type and a driven gear of the screw type both in mesh with said idler; whereby both said driving gear and said driven gear rotate in the same direction; separate bearings for said driving and driven gear, respectively, having their axes substantially coplanar and lying in a plane angularly disposed to the axis of said idler gear, and a separate pivotal mounting for each of said last mentioned bearings having its axis coincident with the axis of said idler; whereby either said driving gear or said driven gear may be revolved about the axis of said idler with respect to the other.

GEORGE E. OAKLEY.
PERCY M. GRIFFIN.